Oct. 10, 1967     H. KARLBY ETAL     3,345,869
FLUID FLOW METER
Original Filed Feb. 26, 1959     4 Sheets—Sheet 1
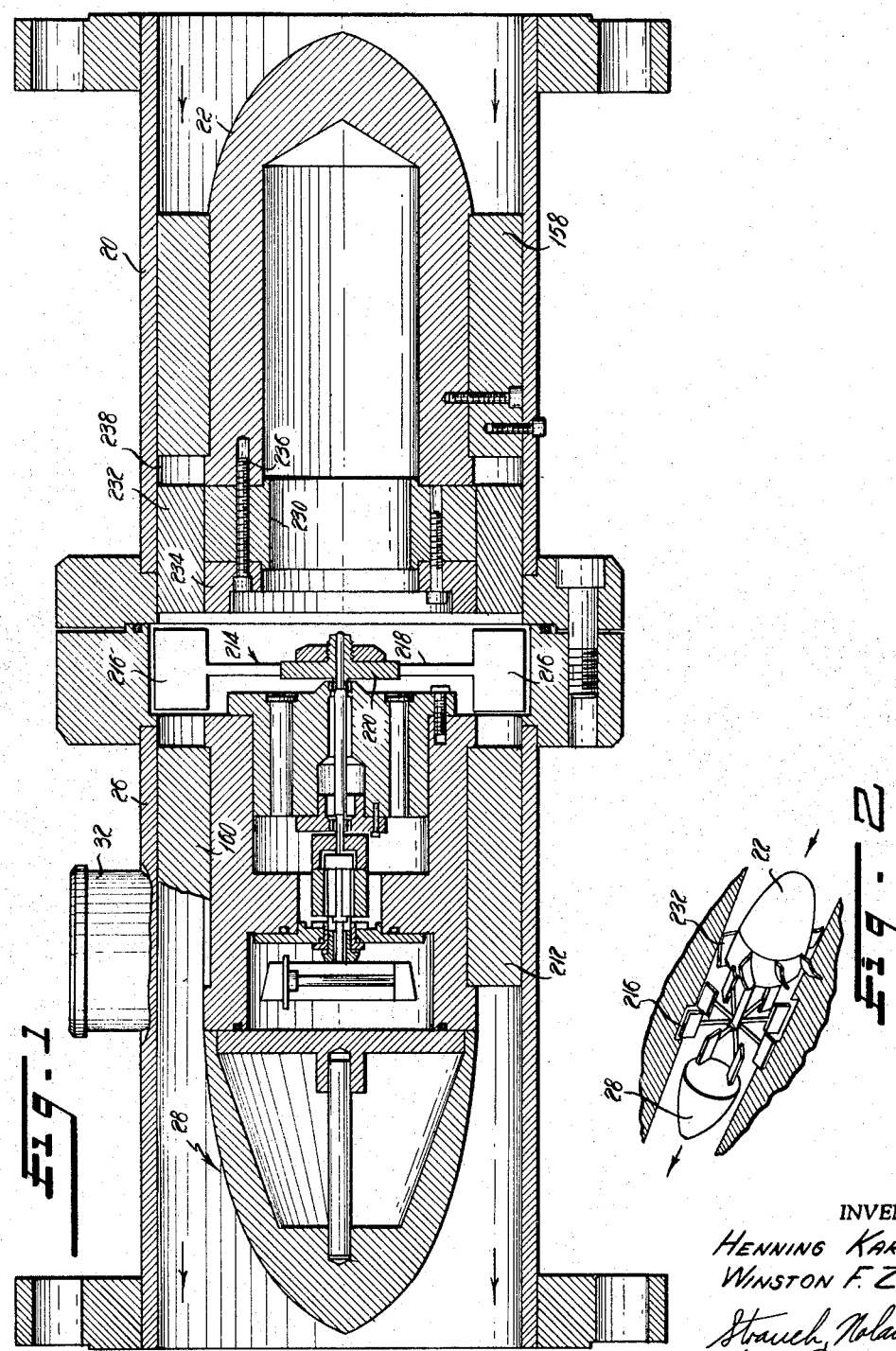
INVENTORS
HENNING KARLBY
WINSTON F. Z. LEE
Strauch, Nolan, Neale,
Nies & Bronaugh
ATTORNEYS

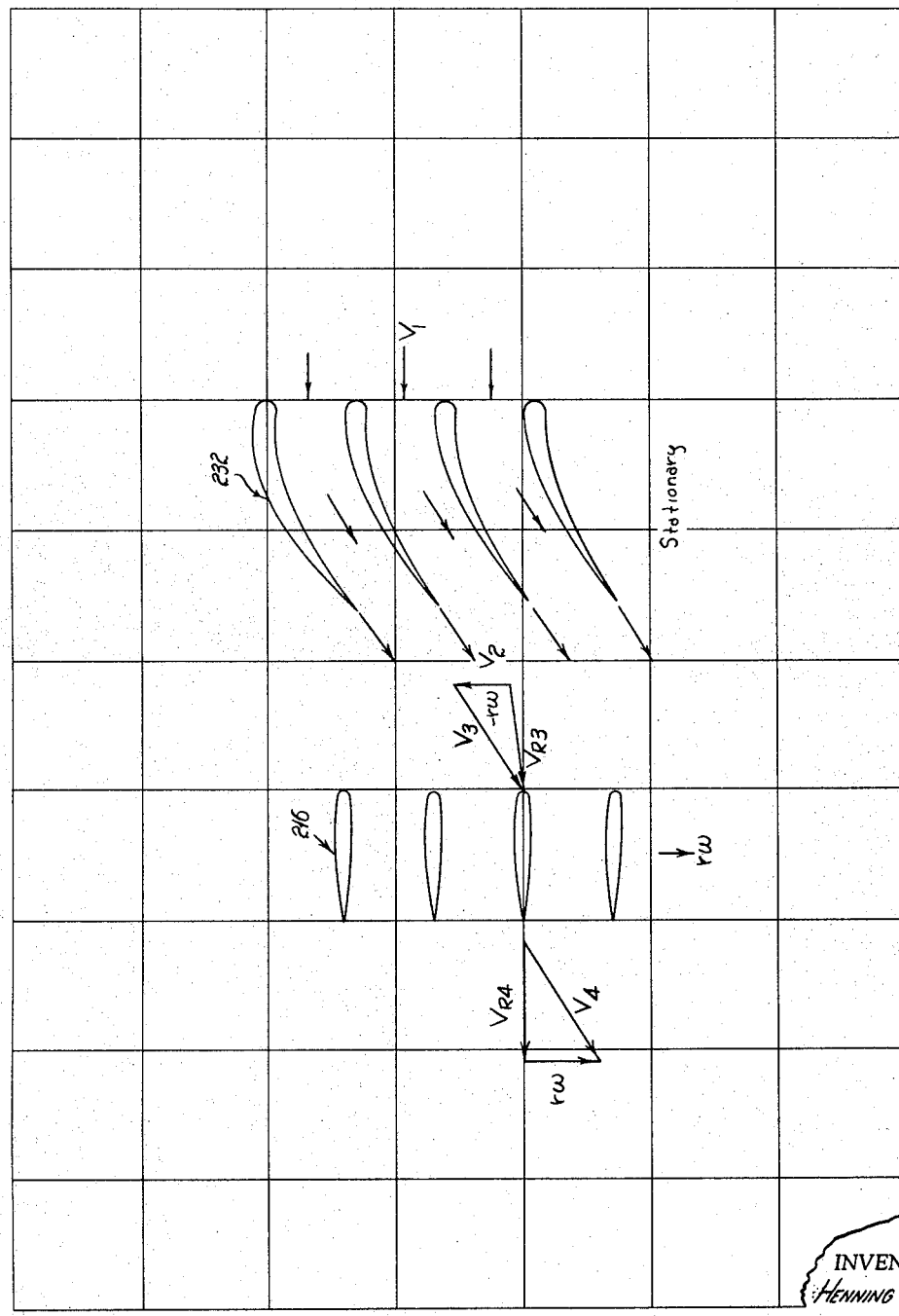

Oct. 10, 1967 H. KARLBY ETAL 3,345,869
FLUID FLOW METER
Original Filed Feb. 26, 1959 4 Sheets-Sheet 3

INVENTORS
HENNING KARLBY
WINSTON F. Z. LEE
BY Strauch, Nolan, Neagle,
Nies & Bronaugh
ATTORNEYS

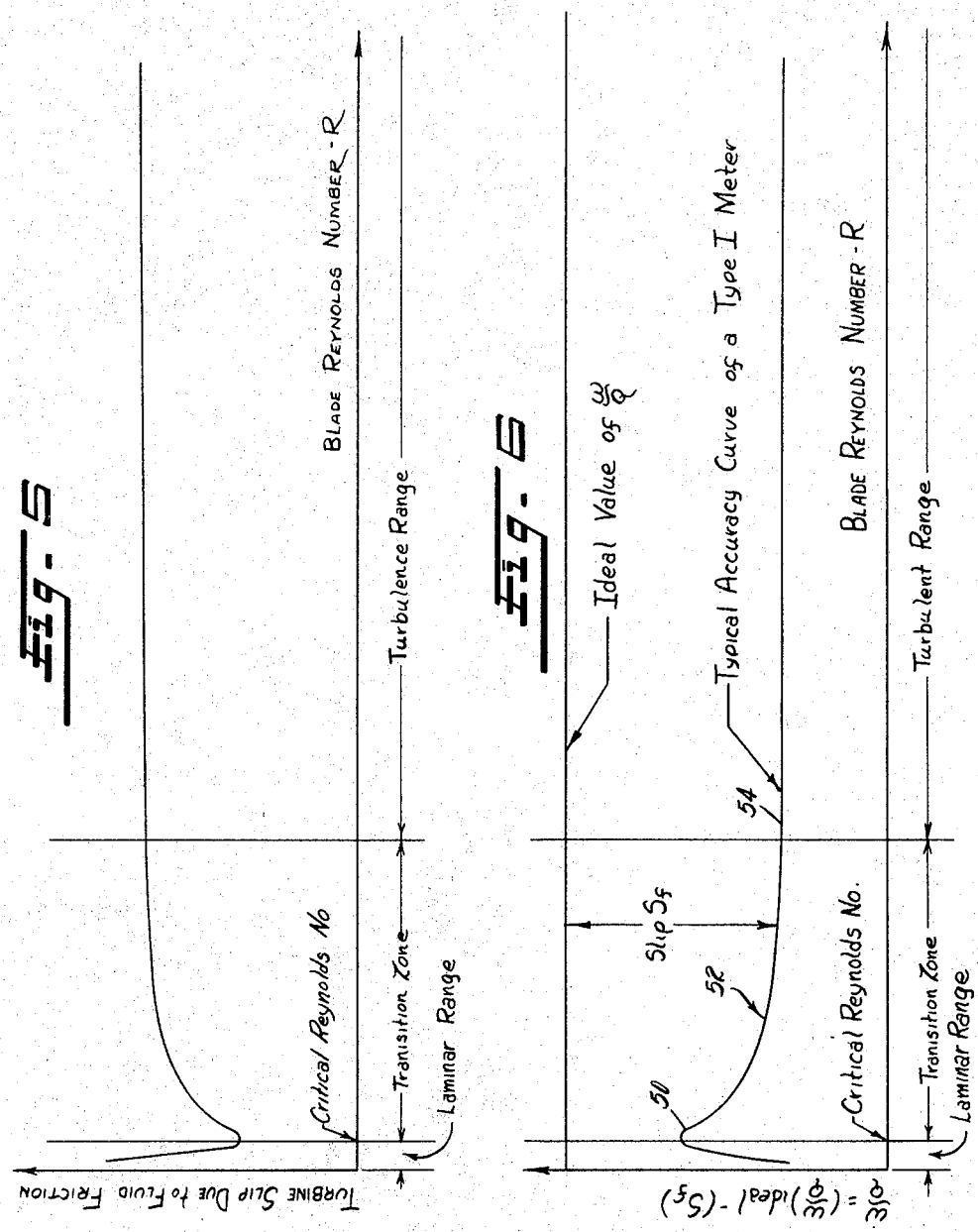

United States Patent Office 3,345,869
Patented Oct. 10, 1967

3,345,869
FLUID FLOW METER
Henning Karlby and Winston F. Z. Lee, Pittsburgh, Pa., assignors to Rockwell Manufacturing Company, Pittsburgh, Pa., a corporation of Pennsylvania
Original application Feb. 26, 1959, Ser. No. 795,755, now Patent No. 3,248,945, dated May 3, 1966. Divided and this application Nov. 24, 1965, Ser. No. 558,151
6 Claims. (Cl. 73—231)

This is a division of co-pending application Ser. No. 795,755 filed Feb. 26, 1959 for Meter, now U.S. Patent No. 3,248,945, and a continuation-in-part of our application Ser. No. 634,662 filed Jan. 17, 1957 (now Patent No. 3,163,041), our now abandoned application Ser. No. 717,863 filed Feb. 27, 1958, and our now abandoned application Ser. No. 717,922 filed Feb. 27, 1958.

The present invention relates to turbine meters and more particularly to improvements in such meters which render them substantially free of metering inaccuracies resulting from the viscosity effect of fluids of high viscosity.

An example of a preferred form of turbine meter adapted for high metering accuracy of low viscosity fluids and having no viscosity compensation is disclosed in our now abandoned application Ser. No. 717,863 filed Feb. 27, 1958.

It has been established theoretically and experimentally that the meter disclosed in said application is satisfactory for high accuracy measurement of fluids of low viscosity such as air, gases, water, gasoline, fuel oils, etc., but that without proper modification, it does not meet extremely high accuracy requirements such as ±0.1% allowable deviation over a flow range ($Q_{max.}/Q_{min.}$ of 5) for high viscosity fluids such as crude oils of high viscosity ranges from a minimum of 35 SUS to a maximum of 5000 SUS as required commercially, particularly where fluids of different viscosities must be metered by the same meter. The main trouble is due to the fact that in turbine meters of that type, the driving forces is proportional to the square of flow ($Q^2$) whereas the resisting force ($F_r$) is proportional to an exponential power of flow (Q) less than the square in fluids of high viscosity, the exact magnitude of which depends upon the Reynolds number of the existing flow condition.

As is well known, the Reynolds number is a dimensionless expression which presents the characteristics of a fluid flow in terms of the velocity of the fluid, the dimensions of the element through which it flows, the density of the fluid, and the viscosity of the fluid. The Reynolds number is directly proportional to the velocity and density, and inversely proportional to the viscosity of the fluid.

In conventional practice, meter accuracy curves are plotted by graphically presenting the ratio of the turbine velocity to the rate of flow through the meter $\omega/Q$ versus the flow rate Q. Such a curve gives information about the meter accuracy when fluid of only one viscosity is metered. If fluid of another viscosity is to be metered, another accuracy curve is required to reflect the meter characteristics in fluid of the new viscosity.

After a great deal of study, it has been determined that a much more useful meter accuracy curve can be obtained by plotting the ratio of turbine speed to flow rate, $\omega/Q$ versus the Reynolds number of the flow through the meter taken at a significant point within the meter. It has further been determined that the Reynolds number of the flow through the turbine blades of the meter provides the best representation of flow characteristics through the meter. Thus, the "blade Reynolds number" is utilized as the base against which the ratio of turbine speed to flow rate $\omega/Q$ is plotted to give an extremely useful accuracy curve for a meter.

To further illustrate this concept of Reynolds number accuracy curve, it will be seen that it is quite possible for a fluid of relatively low viscosity, flowing with a relatively low velocity, to have the same characteristic of flow—and Reynolds number—as a relatively viscous fluid flowing at a higher velocity. Further, each of these fluid flows will result in the same ratio of turbine speed to flow rate $\omega/Q$ so that they can be plotted as a single point in the Reynolds number accuracy curve. If, however, the two fluid flows were plotted as points on accuracy curves utilizing the flow rate as a base, they would be points on two separate curves, each of which would be peculiar to only fluid of the same viscosity as that utilized in the test.

In a conventional system of plotting the ratio of $\omega/Q$ versus rate of flow Q, the plot must be a horizontal straight line in order for the meter to accurately meter fluid of a given viscosity at all rates of flow. If fluid of another viscosity is to be metered, another accuracy curve must be plotted and this, too, must be a horizontal straight line if the meter is to accuractely meter fluid of that viscosity. When utilizing a meter accuracy curve which depicts the ratio of turbine velocity to flow rate $\omega/Q$ versus the blade Reynolds number, only a single meter accuracy curve need be considered for fluids of all viscosities. If this accuracy curve is a horizontal straight line, the meter will accurately meter fluid of any viscosity at any flow rate.

Physically, no meter has yet been constructed which will accurately meter fluid over the entire range of Reynolds numbers. For all practical purposes, however, a range of Reynolds numbers for a specified metering purpose may be selected. Thus, considering the maximum and minimum flow rates and the maximum and minimum fluid viscosities desired for a particular application, a range of Reynolds numbers may be selected which will include all possible combinations of viscosity and flow velocities within the desired limits. A meter which has a horizontal straight line for a blade Reynolds number accuracy curve over the selected range of Reynolds numbers will, accordingly, meet the specified metering requirements.

Experimental results indicate the turbine meter disclosed in our copending application Ser. No. 717,863 has a straight line blade Reynolds number accuracy curve over the high Reynolds number range. However, at the lower Reynolds numbers—which are a result of high viscosities—the accuracy curve of the meter does not remain a horizontal straight line. Instead, the Reynolds number accuracy curve of a turbine meter of that type will have a "hump" in fluids of high viscosity for flows within the operating range rather than a flat curve as in fluid of low viscosity. It is therefore necessary to introduce some special device into a turbine meter of that type to eliminate the viscosity effect of fluid of high viscosity on the meter accuracy.

The present invention therefore contemplates the provision of a special turbine meter for accurately metering and recording the flow of viscous and extremely viscous fluids and comprises a metering turbine disposed in a conduit in the path of fluid flowing through the conduit and means for substantially eliminating the viscosity effect of the fluid as it passes through the metering turbine.

With the foregoing considerations and purposes in mind, it is the major object of this invention to provide means for changing the natural Reynolds number accuracy curve of the meter disclosed in our copending application Ser. No. 717,863 so that the resulting changes will flatten the accuracy curve in the range of lower Reynolds numbers and allow fluids of higher viscosity to be accurately metered.

It is a further object of this invention to provide a novel axial flow turbine meter embodying a zero blade angle metering turbine where the profile drag on the rotor blades acts only along the axial direction of the turbine, the effect of which is to eliminate the viscosity effect of the fluid being metered.

These and other objects of the present invention will become more fully apparent as the description proceeds in connection with the appended claims and the annexed drawings wherein:

FIGURE 1 is a longitudinal sectional view of a turbine meter illustrating a further embodiment of the present invention;

FIGURE 2 is a detailed longitudinally exploded view of the embodiment of FIGURE 1 with the meter casing broken away and the parts therein axially separated for clarity;

FIGURE 3 is a diagrammatic circumferential development of the metering turbine and guide vanes of the embodiment of FIGURE 1;

FIGURE 5 is a plot illustrating the relation between total turbine slip ($S_f$) due to fluid friction and the blade Reynolds number of the fluid flow; and FIGURE 6 is a plot illustrating the blade Reynolds number accuracy curve or the relation between the angular velocity of the metering turbine per unit volume of fluid flow and the blade Reynolds number of the fluid flow.

Figure 4:
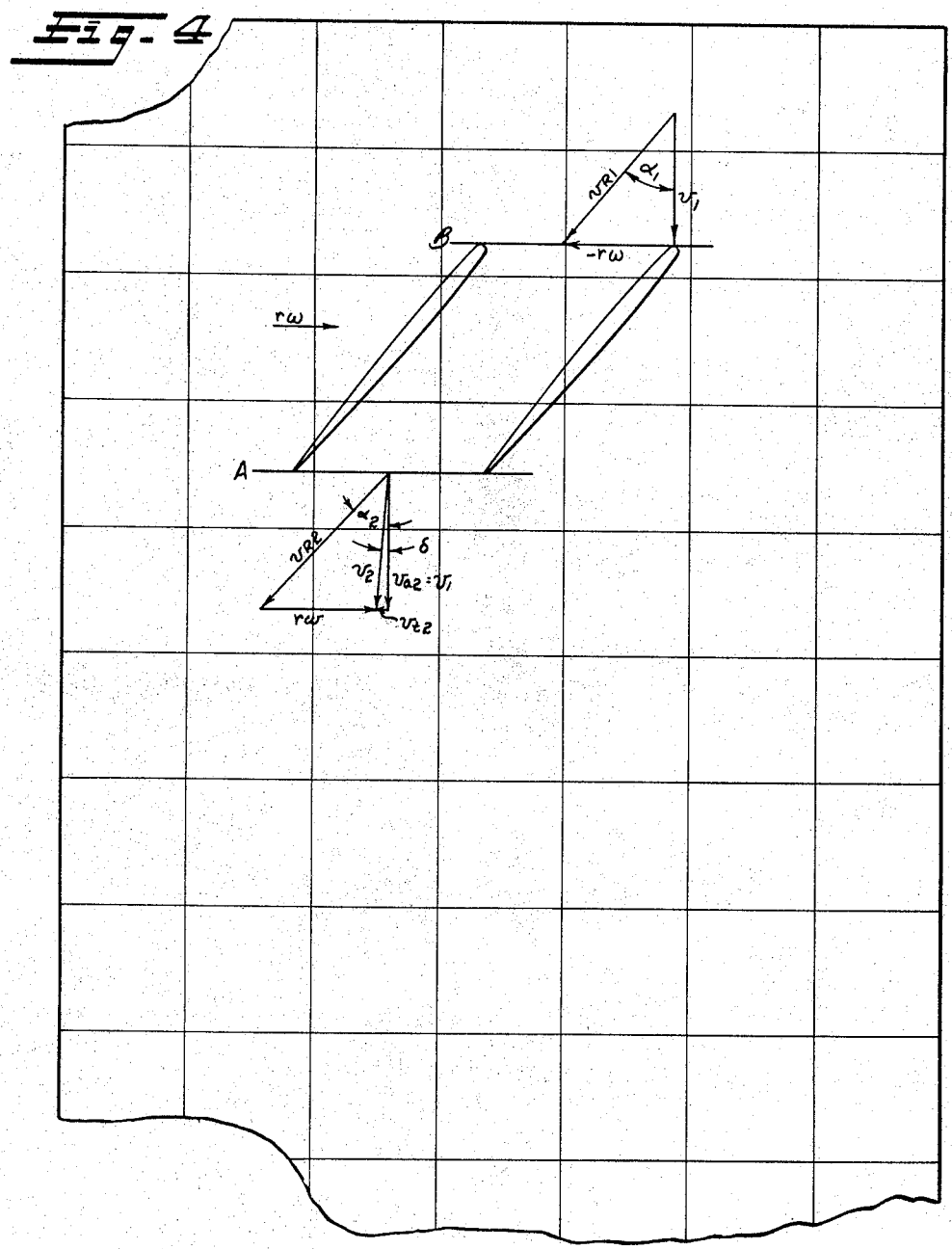
FIGURE 4 is a vectorial diagram illustrating velocities at synchronous speed for a meter which does not compensate for fluid viscosity.

This disclosure of the present invention will proceed with an analysis of the operation of turbine meters and the relation thereof to the present invention followed by a detailed description of the construction embodying the principles of the present invention.

FIGURES 1-3 illustrate a turbine meter constituting a practical embodiment of the principles of the present invention for use in metering fluids of various viscosities. Referring now to FIGURE 4, velocity vector diagrams are illustrated for the synchronous speed condition of a turbine meter without viscosity compensation as illustrated in FIGURE 19 of the above-identified copending application (Ser. No. 717,863) and hereinafter referred to as the Type I turbine meter.

With continued reference to FIGURE 4, the velocity $v_1$ is the absolute velocity of the fluid at the inlet to the metering element or the metering turbine, velocity $v_2$ is the absolute discharge velocity of the fluid from the metering element and velocity $r\omega$ is the linear velocity at a radius $r$ of the metering element rotating with an angular velocity $\omega$. Velocity $v_{R2}$ is the discharge velocity of the fluid relative to the rotating metering turbine. For a particle of fluid moving along the blade with a velocity $v_R$ relative to the blade, the particle wil leave the blade at A with the velocity $v_{R2}$ if the blade is at rest. If the blade is moving in direction shown with a magnitude $r\omega$, and the velocity of the particle still has a velocity $v_R$ relative to the blade, and remains in contact with the blade to the end A, the absolute velocity of the fluid as it leaves the blade at A will be the vector sum of the velocities $v_{R2}$ and $r\omega$. Thus, the vectorial sum of the turbine velocity and the relative velocity will yield the absolute discharge velocity $v_2$. In a theoretically perfect system where no resisting torques are encountered in passage of the fluid through the metering element, the absolute discharge velocity would be vectorially equal to the absolute inlet velocity of the fluid being metered since there would be no slip of the turbine. Hence, all of the fluid passing between the blades of the turbine would be metered and recorded and the value of the ratio $\omega/Q$ would be the ideal value indicated by the horizontal straight line in FIGURE 6. Under actual conditions, however, there are resisting forces, as will be described, of such nature and magnitude to cause significant turbine slip and thereby affect the accuracy of the meter unless compensated for. As used in this application, "slip" will broadly designate those effects which tend to bring the actual value of the ratio of turbine speed to flow rate $\omega/Q$ below the ideal value that would results if all the fluid passing through the turbine were metered and recorded. This turbine slip due to prevailing forces resisting the rotation of the turbine is evinced by and directly related to the tangential velocity component $v_{t2}$ of the fluid flowing through the turbine. Such a tangential velocity vectorially adds to the absolute inlet velocity $v_1$ to the resultant absolute discharge velocity $v_2$. As the viscosity of the fluid changes, the resisting force is changed for a given flow rate, resulting in a corresponding change in the tangential velocity $v_{t2}$ especially in the region of the lower Reynolds numbers. This change of the tangential velocity $v_{t2}$ results in turn in a varying turbine slip which is effective to adversely affect the accuracy of metering registration.

The following analysis serves to exemplify the effect that the resisting forces resulting from fluid friction and mechanical friction have on the accuracy of a turbine meter.

*Analysis of the turbine meter in fluids of high viscosities*

By means of flow straighteners and proper design of the turbine housing and approaching hub, the inlet velocity $v_1$ to the blades of the turbine can be assumed to be purely axial and uniformly distributed across the entire annular flow passage leading to the metering turbine.

Consider first the Type I turbine meter being steadily rotated in synchronous condition by a fluid of high viscosity and having the velocity diagrams shown in FIGURE 4. Since the driving force $F_d$ exerted upon the turbine by the fluid can be no greater than the resisting force $F_r$ of the turbine, it will be useful to analyze the resisting forces on the turbine and to consider their nature.

It can easily be shown by basic laws of fluid dynamics that the driving force $F_d$ exerted on the turbine is equal to the mass rate of flow $\dot{m}$ through to the meter multiplied by the change in absolute tangential velocity $v_{t2}$ of the fluid passing through the meter or $$F_d = \dot{m} v_{t2}$$

The mass rate of flow $\dot{m}$ is equal to the density of the fluid $\rho$ multiplied by the volumetric rate of flow $Q$ or $\dot{m} = \rho Q$.

Now, if the turbine were in the ideal state, having no resisting forces of any kind, the turbine would move in exact timed relation to the fluid flow and no force would be required to drive it or $F_d$ would be zero. This is readily apparent since the fluid would not be deviated in a tangenial direction as it passed through the turbine so that $v_2$ would equal $v_1$ (FIGURE 4) and $v_{t2}$ would equal zero.

It is unnecessary to note that this ideal condition cannot exist and that the turbine has resisting forces which must be overcome by the force created by the fluid flowing through the meter. In a meter turbine, as opposed to a power turbine, the forces $F_r$ to be overcome by the driving force $F_d$ are relatively small. They may be conveniently considered to be of two classes. The first is a resistance force $F_m$ due to the mechanical resistance of the friction created by the bearing loads and the register load. Because of the construction of the turbine meter with magnetic shaft suspension, magnetic register drive and low-torque register, as fully discussed in our now abandoned application 717,863, the mechanical resistance force $F_m$ is held to a minimum. Further, it is relatively constant and independent of the flow rate $Q$. For these reasons, the mechanical resisting forces $F_m$ have no appreciable effect on the accuracy of the turbine meter in its operating flow range and may be disregarded for the purposes of this analysis.

The second resisting force which must be considered is the force due to the fluid friction acting upon the rotating parts of the meter. While the fluid exerts a resisting force on the spokes of the turbine, the hub of the turbine, and all other rotating parts, it has been found that the greatest resistance force acts upon the blades of the turbine. By proper design of the turbine, it is possible to minimize the fluid resisting force acting upon the parts of the turbine other than the blades so that it is only a very small fraction of the resisting force acting up the turbine blades. For the purposes of this discussion, the resisting force acting upon all parts of the turbine except the blades may be considered to be negligible. The resisting force $F_f$ created by the fluid friction acting upon the blades of the turbine should be considered in some detail to gain an understanding of the present invention.

However, before considering the fluid friction resisting force $F_f$ acting upon the turbine blades, some attention will be given to the characteristics of flow through the turbine meter. Considering for the moment a fluid of fixed viscosity and density flowing through the meter, at very low fluid velocities, the flow through the meter is laminar. As the fluid velocity increases, areas of turbulence develop until finally, the flow of fluid through the meter becomes completely turbulent.

Just when this change of flow characteristic takes place depends upon the nature of the fluid flow passage. For any turbine meter, there is fluid velocity for any particular fluid below which turbulent flow cannot take place and all flow is laminar. Since this flow rate is for a particular fluid (i.e., a fixed density and viscosity) and through a particular flow passage (i.e., the blade area of the turbine meter), it may be expressed in terms of the Reynolds number. Thus, the Reynolds number below which only laminar flow takes place is designated as the critical Reynolds number and is so indicated on FIGURE 3.

The high Reynolds numbers indicate the range where the flow is completely turbulent. The change of the flow characteristics from a laminar flow to completely turbulent flow is not an instantaneous occurrence at the critical Reynolds number. Rather, because of the nature of flowing fluid, there is a transition zone embracing those Reynolds numbers immediately to the right (FIGURE 5) of the critical Reynolds number in which the flow is partially turbulent and partially laminar. This area creates difficulties in predicting exactly how the turbine will behave. However, since the present invention teaches the use of a single blade Reynolds number accuracy curve to show the characteristics of the meter, it is possible—by utilizing this accuracy curve—to analyze the effects of the flow in the complete range of Reynolds numbers and to compensate for them in a manner to be described.

Returning now to the resisting force $F_f$ acting upon the blades as a result of the fluid friction, it is this force which creates the major deviations from the ideal in the blade Reynolds number accuracy curve. To indicate just how these forces affect the turbine operation, the fluid resisting force $F_f$ for each of the three ranges of flow patterns—laminar flow, turbulent flow and transition zone—are analyzed and their nature determined.

In the laminar flow range, the fluid friction resisting force created by the fluid passing over the turbine blades is of a viscous nature and will be designated $F_v$. This resisting force $F_v$ acts parallel to the blade surface and so has a tangential component which is opposed to the turbine driving force $F_d$. This resisting force $F_v$ is the predominant cause of the change of tangenial velocity $V_{t2}$ through the turbine in the laminar flow range. To determine the nature of the resisting force $F_v$ due to viscosity, reference may be had to the basic force equation in which $$F_d' = \rho Q v_{t2}'$$

Here, the driving force $F_d'$ required to overcome the viscosity resisting force $F_v$ is equal to the density $\rho$ times the volumetric rate of flow Q times the change in tangential velocity due to the viscous friction of the fluid $v_{t2}'$. Since the resisting force $F_v$ due to the viscosity effect is proportional to the viscosity $\mu$ of the fluid times the volumetric rate of flow Q, it may conveniently be expressed as $$F_v = K\mu Q$$

where $K$ = a proportionality constant. The term K hereinafter will be utilized indiscriminately to designate any undefined proportionality constant without subscripts or modifications except that $K'$ will be utilized when two different constants appear in the same equation. Two different constants in the same equation will be designated as K and K'.

Since the driving force $F_d'$ required to overcome the resisting force $F_v$ due to viscous friction must be equal to the resisting force $F_v$ in the synchronous condition, the last preceding equations may be equated to each other so that $$\rho Q v_{t2}' = K \mu Q$$

Solving for the change in velocity due to the viscosity effect $V_{t2}'$, it will be seen that $$V_{t2}' = \frac{K\mu}{\rho}$$

Thus, tangential velocity change $v_{t2}'$ due to the resisting force $F_v$ of the viscosity effect is directly proportional to the fluid viscosity $\mu$ and inversely proportional to the fluid density $\rho$.

In the turbulent flow range, the fluid friction resisting force which acts upon the turbine blades is of a turbulent nature and will be designated $F_t$. Here, too, the turbulent friction resisting force $F_t$ acts along the surface of the turbine blades so that it has a tangential component which resists the rotary motion of the turbine.

As before, the driving force $F_d''$ required to overcome the turbulent resisting force $F_t$ is equal to the density of the fluid $\rho$ times the volumetric flow rate Q times the change in tangential velocity of the fluid through the turbine $v_{t2}''$ or $$F_d'' = \rho Q v_{t2}''$$

Further, the resisting force $F_t$ exerted on the turbine by the effect of turbulent flow is proportional to the density $\rho$ times the square of the volumetric flow rate Q or $$F_t = K\rho Q^2$$

At synchronous condition, the driving force is equal to the resisting force or $$\rho Q v_{t2}'' = K\rho Q^2$$

Solving for the change of tangential velocity $v_{t2}''$ due to the turbulent effect of the fluid $$v_{t2}'' = KQ$$

Thus, the velocity change $v_{t2}''$ due to the resisting force $F_t$ of the turbulent friction effect of the fluid upon the blades is directly proportional to the flow rate Q and is independent of the viscosity $\mu$ of the fluid.

The resisting force $F_z$ due to fluid friction in the transition zone results from various combinations of a turbulent friction resisting force $F_t$ and a laminar or viscous friction resisting force $F_v$. It has been determined that the frictional resisting force $F_z$ of the fluid friction in the transition zone may be expressed by the following equation:

$$F_z = K\rho Q^2 - K'\mu Q$$

The expression $K\rho Q^2$ is of the same nature as the turbulent resisting force $F_t$ and the expression $K'\mu Q$ is of the same nature as the viscous resisting force $F_v$.

As before, the driving force $F_d''$ required to overcome the fluid friction in the transition zone may be expressed by the basic force formula $$F_d''' = \rho Q v_{t2}'''$$

Since the driving force $F_d''$ must equal the resisting force $F_z$ in the synchronous condition, the last previous equations may be equated to each other. Thus $$\rho Q v_{t2}''' = K\rho Q^2 - K'\mu Q$$

and solving for the change in tangential velocity $v_{t2}'''$ due to the transition resisting force $F_z$ $$v_{t2}''' = KQ - \frac{K'\nu}{\rho}$$

Having determined the tangential velocity changes in the fluid $v_{t2}'$, $v_{t2}''$ and $v_{t2}'''$ due to the fluid friction resisting forces $F_v$, $F_t$ and $F_z$ in the laminar flow range, the turbulent range and the transition zone respectively, it now will be determined how these tangential velocity changes affect the meter accuracy curve. In order to consider this situation, it must be remembered that the change in tangential velocity $v_{t2}$ directly evinces turbine slip. If no resisting forces acted upon the turbine, the tangential velocity change $v_{t2}$ would be zero and the ratio of turbine velocity to flow rate $\omega/Q$ would be ideal, as shown in FIGURE 6. Since it is the ratio of turbine velocity to flow rate $\omega/Q$ which must be constant in order for the turbine to accurately meter fluid, it is necessary to see how the changes of tangential fluid velocity $v_{t2}$ affect this ratio. The amount that the turbine slips, or registers below the ideal value of the ratio $\omega/Q$, will be directly proportional to the amount that the tangential velocity of the fluid $v_{t2}$ changes, divided by the flow rate $Q$. Thus, the slip of the turbine will be equal to $Kv_{t2}/Q$. Since $v_{t2}$ is a linear velocity tangent to the turbine, it must be divided by some radius $r$ to correctly express the ratio of $\omega/Q$. However, for a particular turbine, the radius $r$ will be a constant so that the expression $Kv_{t2}/Q$ is an accurate expression of the slip $S_f$ in terms of the change of tangential velocity $v_{t2}$ of the fluid and the flow rate $Q$.

Referring now to the expressions for the changes of tangential velocities of the fluid in the laminar range, the turbulent range and the transition zone, it will be seen that the slip $S_f$ of the turbine in each of the ranges may be expressed merely by multiplying the expressions for the tangential velocity changes by the term $K/Q$.

Thus, in the laminar flow range, the tangential velocity change $v_{t2}'$ due to the viscosity resisting force $F_v$, when multiplied by the term $K/Q$ yields the expression for the turbine slip $S_f'$ due to the viscosity force $F_v$ or:

$$\frac{K}{Q}v_{t2}'$$

wherein $$v_{t2}' = K\frac{\mu}{\rho}$$

Thus $$S_f' = \frac{K\mu}{\rho Q}$$

It will further be noted that the expression of $S_f'$ makes it proportional to the fluid viscosity $\mu$ and inversely proportional to the fluid density $\rho$ and the flow rate $Q$. This expression, then, is inversely proportional to the Reynolds number $R$ for the particular turbine meter or:

$$S_f' = \frac{K}{R}$$

In the turbulent range, the change in the tangential velocity $v_{t2}''$ due to the turbulent resisting force $F_t$, when multiplied by the term $K/Q$ yields the expression for the turbine slip $S_f''$ due to the turbulent force $F_t$ or $$\frac{K}{Q}v_{t2}''$$

wherein $$v_{t2}'' = KQ$$

Thus $$S_f'' = K$$

It will be noted that in the turbulent range, the slip $S_f''$ is constant, which does not impair the meter accuracy.

In the transition zone, the tangential velocity change $v_{t2}'''$ due to the fluid resisting force $F_z$, when multiplied by the term $K/Q$ yields the expression for the turbine slip $S_f'''$ due to the resisting force $F_z$ or $$\frac{K}{Q}v_{t2}'''$$

wherein $$v_{t2}''' = KQ - K'\frac{\mu}{\rho}$$

Thus $$S_f''' = K - \frac{K'\mu}{\rho Q}$$

As has been previously stated in discussing the slip due to the viscosity resisting force $F_v$, the expression $K\mu/\rho Q$ is inversely proportional to the Reynolds number of the particular turbine meter involved or $$S_f''' = K - \frac{K'}{R}$$

Referring now to FIGURE 5, it may be seen that the slip $S_f$ of the meter throughout the range of Reynolds numbers is plotted. In the laminar range, the slip $S_f$ varies in accordance with the expression $$S_f = \frac{K}{R}$$

as the slip is due to the viscous resisting force $F_v$.

As the Reynolds number increases to a value above the critical Reynolds number, the flow characteristics change and the slip $S_f$ varies in accordance with the expression $$S_f = K - \frac{K'}{R}$$

as the slip $S_f$ is due to the fluid resisting force $F_z$.

When the Reynolds number increases to a value above which the flow is completely turbulent, an area of constant slip in accordance with the expression $$S_f = K$$

is entered since the slip is due to the fluid resisting force $F_t$.

The blade Reynolds number accuracy curve of the Type I turbine meter is represented in FIGURE 6. As hereinbefore described, the ideal value of the ratio of turbine speed to volumetric flow rate $\omega/Q$ would be a horizontal straight line over the entire range of Reynolds numbers, as indicated on FIGURE 6. However, the turbine resisting forces just discussed cause a slip $S_f$ of the turbine which varies over the range of Reynolds numbers. This slip $S_f$, when subtracted from the theoretical value of the ratio of $\omega/Q$ yields the Reynolds number accuracy curve. The accuracy curve for the Type I turbine meter, as shown in FIGURE 6, has been completely verified by experimental results. It has a hump around the critical Reynolds number before it reaches the flat part of the curve. For fluids of low and medium viscosities (such as air, natural gas, gasoline, water, thin oils, etc.) a Type I turbine meter of reasonable size (4 inch size and above) will mainly operate on the flat part of the accuracy curve for a reasonable flow range. However, in case of fluids of high viscosity, the accuracy curve will include the hump as well as the flat part, resulting in rather large maximum deviation. The critical Reynolds number of a turbine meter depends somewhat upon the initial turbulence of the flow before entering the turbine and the particular design of the meter. The higher the initial turbulence, the lower the critical Reynolds number. For the turbine meter shown in said copending application Ser. No. 717,863, this critical value of the blade Reynolds number is found by actual test to be about 2300.

Extensive tests in a great variety of fluids (air, natural gas, gasoline, Stoddard solvent, thin oil and thick oil) of the turbine meter disclosed in said copending application Ser. No. 717,863 and several other models designed according to the above analytical findings show a good agreement between the experimental results and theoretical analysis.

The embodiment shown in FIGURES 1–3 is partly identical with the structure disclosed in said copending application Ser. No. 717,863. The turbine meter illustrated therein comprises a cylindrical inlet conduit section 20 having a faired core section 22 and an outlet conduit section 26 having a faired core section 28. Core sections 22 and 28 are respectively supported coaxially by equiangularly spaced longitudinally extending ribs 210 and 212. Core section 28 journals a meter turbine 214 and contains a drive train to a register 32. Since this structure is identical to that disclosed in said copending application Ser. No. 717,863 with the exception of the turbine 214, no further description thereof will be given.

The turbine 214 comprises a plurality of longitudinally extending blades 216 of zero blade angle spaced equiangularly apart and individually supported by spokes 218 which radiate from a central hub 220. Mounted on an annular core section 230 adjacent to and upstream of turbine 214 are a plurality of fixed guide vanes 232 equiangularly spaced apart relative to the axis of turbine 214 and curved to impart a selected direction of inlet fluid velocity to the turbine rotor with least disturbance (FIGURE 3). The annular core section 230 is coaxial with the turbine 214 and is mounted between the inner end of the faired core section 22 and collar 234 by machine screws 236. Thus, fluid to be metered passes into the annular channel 238 and is directed into the turbine 214 by the fixed vanes 232.

Referring now to FIGURE 3, the blade angle of the individual turbine blades 216 of the metering turbine 214, as measured from the axial direction, is shown to be reduced to zero as hereinbefore described. By the addition of the stationary flow directing guide vanes 232 upstream of the metering turbine, a tangential component to the inlet velocity of the fluid entering the metering turbine is obtained. As hereinbefore discussed in the analysis of the Type I turbine meter, the resisting forces due to the fluid friction $F_f$ on the turbine blades act along the surface of the blades. Due to considerations of fluid dynamics, the blades of the Type I meter are provided with a blade angle $\beta$ measured from the axial direction which is in the range of 20° to 60°. By this Type I meter blade construction, it will be appreciated that since the fluid frictional resisting force $F_f$ act along the surfaces of the blades, then they have a substantial component ($F_f \sin \beta$) which acts in a tangential direction to oppose the rotation of the turbine and cause turbine slip.

In the metering turbine with a zero blade angle as described in the embodiment of FIGURES 1–3 of the present invention, the tangential component of the fluid friction resisting force $F_f$ is consequently zero ($F_f \sin 0° = 0$) and the entire force $F_f$ due to fluid friction is taken up by the low-friction thrust bearings of the turbine. Since the thrust on the low-friction thrust bearings due to the fluid force $F_f$ produces only very small resistance to the rotation of the turbine because of the extremely low coefficient of bearing friction on the small moment arms at the bearings, it produces no appreciable metering inaccuracies. Thus, the zero blade angle turbine is subject to much less viscosity effect than the turbines with substantial blade angles.

In order to drive the zero blade angle turbine 214, stationary flow directing vanes 232 function to establish a tangential velocity component to the fluid entering the turbine so that the turbine will be driven at speeds acceptable for accurate metering.

With continued reference to FIGURE 3 which shows the blade profiles of the stationary vanes 232 and the zero blade angle turbine 214, the fluid enters the stationary vanes or stator 232 with a velocity $V_1$ which is purely axial and uniformly distributed. The stationary vanes 232 efficiently redirect the fluid so that it emerges with an exit velocity $V_2$ which has a tangential velocity component. This redirected velocity $V_2$ becomes the turbine inlet velocity $V_3$ and provides the driving force which drives the metering turbine 214 with an angular velocity $\omega$ and the blades 216 with a linear velocity $r\omega$. By this construction, the turbine exit fluid velocity $V_{R4}$ relative to the blades 216 of the turbine is axial. Thus, the fluid resisting force $F_f$ acting along the surface of the blade exerts no restraining force opposite to the direction of rotation of the turbine, but rather, causes only an increased thrust on the turbine bearings.

The embodiment of FIGURES 1–3 provides for the employment of a longitudinal extending zero blade angle turbine. By this structure, the tangential component of the profile drag is zero and thus no effective resistance to the turbine rotation by the effect of fluid friction is exerted on the blades of the turbine.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An axial flow impulse turbine meter comprising a housing, a bladed turbine metering rotor rotatably mounted in said housing for driving a registering mechanism, means for guiding motive fluid through said housing in a solid annular, axially flowing stream extending parallel to the axis of rotation of said rotor, said rotor having a plurality of zero blade angle radial blades extending in the path of said annular stream and being contained in planes which extend radially from the rotor rotational axis, and a circumferential row of equiangularly spaced apart fixed blades mounted in said housing in the path of said stream and at a predetermined distance upstream from said rotor blades, said fixed blades having outlet portions extending at an acute angle with respect to the rotor rotational axis to provide the axially flowing stream entering said rotor with a tangential velocity component for driving said rotor, said stream leaving said fixed blades and entering said rotor being oriented relative to said zero angle blades to effect the translation of substantially the entire magnitude of the fluid frictional force acting on said rotor into an axial thrust.

2. The axial flow turbine meter defined in claim 1 wherein said rotor is rotated substantially only by said tangential velocity component and wherein the inner and outer boundaries of said annular stream are uniformly diametered at least from a region that is upstream from said fixed blades to the region where it enters said rotor.

3. The axial flow turbine meter defined in claim 2 wherein said fixed blades are arranged about an axis that axially aligns with the rotational axis of said rotor said fixed blades being curved to provide said outlet portions and having straight inlet portions extending substantially parallel to the rotor rotational axis.

4. The axial flow turbine meter defined in claim 3 comprising fixed vane means disposed a predetermined distance upstream from said fixed blades and being disposed in said annular stream to direct fluid entering said fixed blades with a velocity that is essentially axial with respect to the axis about which said fixed blades are disposed.

5. The axial flow turbine meter defined in claim 4 wherein said motive fluid guiding means comprises a core structure disposed in said housing in axial alignment with the rotor rotational axis and defining the inner boundary of said annular stream, wherein said vane means comprises a plurality of angularly spaced apart guide vanes mounted on said core structure and extending radially in said annular stream, and wherein said fixed blades are mounted on said core structure.

6. An axial flow impulse turbine meter comprising a housing having a pair of axially aligned, centrally separable sections, a bladed turbine metering rotor rotatably mounted in said housing for driving a registering mechanism, means comprising a core structure disposed in said housing in axial alignment with the rotor rotational axis for guiding rotor fluid through said housing in a solid annular, axially flowing stream extending parallel to the axis of rotation of said rotor, said core structure defining the inner boundary of said annular stream and having axially aligned, axially separable, abutting sections, said rotor having a plurality of zero blade angle radial blades extending in the path of said annular stream and being contained in planes which extend radially from the rotor rotational axis, a circumferential row of equiangularly spaced apart fixed blades mounted on one of the core structure sections within said housing and being arranged about an axis that axially aligns with the rotational axis of said rotor, said fixed blades being disposed in the path of said stream and at a predetermined distance upstream from said rotor blades to provide the axially flowing stream entering said rotor with a tangential velocity component for driving said rotor, said rotor being rotated substantially only by said tangential velocity component, the inner and outer boundaries of said annular stream being uniformly diametered at least from a region that is upstream from said fixed blades to a region where it enters said rotor, and fixed vane means comprising a plurality of angularly spaced apart, radially extending guide vanes mounted on the other of said core structure sections at a predetermined distance upstream from said fixed blades and being disposed in said annular stream to direct fluid entering said fixed blades with a velocity that is essentially axial with respect to the axis about which said fixed blades are disposed, said core structure being provided with an annular periphery of essentially constant diameter axially between the upstream edges of said fluid guide vanes and the downstream edges of said fixed blades, said rotor being coaxially mounted only in one of said housing sections, and said core structure being coaxially mounted only in the other of said housing sections.

References Cited

UNITED STATES PATENTS

| | | | |
|---|---|---|---|
| 1,152,952 | 9/1915 | Kepka | 73—231 X |
| 2,146,827 | 2/1939 | Kruspi | 73—231 X |
| 2,934,947 | 5/1960 | Buck | 73—231 X |
| 3,043,139 | 7/1962 | Waugh et al. | 73—194 |
| 3,063,295 | 11/1962 | Dowdell | 73—194 |
| 3,144,768 | 8/1964 | Gehre | 73—229 X |

JAMES J. GILL, *Acting Primary Examiner.*

RICHARD C. QUEISSER, *Examiner.*

E. D. GILHOOLY, *Assistant Examiner.*